(12) United States Patent
Schmidt

(10) Patent No.: US 9,008,725 B2
(45) Date of Patent: Apr. 14, 2015

(54) STRATEGICALLY LOCATED TOUCH SENSORS IN SMARTPHONE CASING

(71) Applicant: BlackBerry Limited, Waterloo (CA)

(72) Inventor: David M. Schmidt, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/649,832

(22) Filed: Oct. 11, 2012

(65) Prior Publication Data

US 2014/0106814 A1    Apr. 17, 2014

(51) Int. Cl.
*H04M 1/00*    (2006.01)
*H04W 88/02*    (2009.01)

(52) U.S. Cl.
CPC ................................. *H04W 88/02* (2013.01)

(58) Field of Classification Search
CPC .................................................. H04W 88/02
USPC ............... 455/556.1, 567, 66.1, 575.1, 95; 345/173
See application file for complete search history.

(56) References Cited

U.S. PATENT DOCUMENTS

| | | | |
|---|---|---|---|
| 7,653,883 B2 | 1/2010 | Hotelling et al. | |
| 7,656,393 B2 * | 2/2010 | King et al. | 345/173 |
| 8,184,423 B2 | 5/2012 | Rothkopf | |
| 8,259,080 B2 * | 9/2012 | Casparian et al. | 345/173 |
| 8,368,658 B2 * | 2/2013 | Brisebois et al. | 345/173 |
| 2005/0253815 A1 | 11/2005 | Blacklock et al. | |
| 2006/0197750 A1 * | 9/2006 | Kerr et al. | 345/173 |
| 2007/0103454 A1 | 5/2007 | Elias | |
| 2008/0167861 A1 | 7/2008 | Inoue et al. | |
| 2008/0316181 A1 | 12/2008 | Nurmi | |
| 2009/0262078 A1 | 10/2009 | Pizzi | |
| 2009/0312051 A1 * | 12/2009 | Hansson et al. | 455/556.1 |
| 2011/0159915 A1 | 6/2011 | Yano et al. | |
| 2011/0267294 A1 * | 11/2011 | Kildal | 345/173 |
| 2011/0312349 A1 | 12/2011 | Forutanpour et al. | |

FOREIGN PATENT DOCUMENTS

| | | |
|---|---|---|
| EP | 2 085 866 A1 | 8/2009 |
| EP | 2 178 277 | 4/2010 |
| JP | 2008252703 A | 10/2008 |
| WO | WO 2007/103631 | 9/2007 |
| WO | 2012/097545 A1 | 7/2012 |

OTHER PUBLICATIONS

EP Search Report related to EP Application No. 12188109.8, dated Jun. 5, 2013, pp. 1-7.

* cited by examiner

*Primary Examiner* — Sanh Phu
(74) *Attorney, Agent, or Firm* — Brinks Gilson & Lione

(57) ABSTRACT

A wireless or handheld device or phone is equipped with corner sensors which control functioning of the device. The corner sensors are configured based how a user holds the handheld device while utilizing the corner sensors. The corner sensors may also be configured based on a spatial orientation of the handheld device. The corner sensors may be configured based on which hand or hands control the corner sensors, the dexterity of the fingers controlling the sensors and/or the spatial orientation of the device. The corner sensors may include a touch sensor, a trackpad and/or a pressure sensor and may detect various single sensor inputs or simultaneous gestures. The device may sense when it is held in a hand and may disable the corner sensors when it is not held.

19 Claims, 6 Drawing Sheets

STRATEGICALLY LOCATED TOUCH SENSORS IN SMARTPHONE CASING

BACKGROUND OF THE INVENTION

1. Technical Field

This system relates to a handheld electronic device, and more particularly, to strategically locating sensors on a handheld electronic device casing.

2. Related Art

Handheld electronic devices, such as smart phones often have switches placed on the sides of the outside casing of the device. The switches may be placed on the sides of the device for easy access. Such placement of special function switches may enable a user to directly activate or control various functions quickly, without having to navigate through multiple levels of a graphical user interface to find a software control. For example, a rocker switch or push button on the side of a smart phone may enable a user to quickly control the volume of the device. Even devices that may have other physical user interfaces, such as touch screens, mechanical keyboards and thumb wheels on the face of the device, may have various special purpose switches on the sides of the device.

SUMMARY

A method is disclosed for controlling a handheld device. The method includes receiving input by one or more corner sensors on the handheld device. Each of the corner sensors may be equipped on a rounded corner of a case edge of the handheld device. One or more of the corner sensors may be configured based on how a user holds the handheld device for utilizing the corner sensors. The corner sensors may also be configured based on a spatial orientation of the handheld device. Functions of the handheld device may be controlled based on the input received by the one or more corner sensors.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE EMBODIMENTS

The system briefly described above and described in further detail below generally relates to a handheld electronic device which may be a wireless phone, a smart phone, a computer tablet, or may be any handheld electronic device. A user may control the handheld device via sensors located on the corners of the device. The corner location of the sensors may enable easy manipulation of the controls while the user holds the device in one hand. The corner sensors may include touch and/or pressure sensors. The corner sensors may be configured based on the orientation in which the device is being held in the user's hand or which hand is holding it. The device may sense when it is being held and may disable the corner sensors when it is not in use in order to avoid accidental sensor input. The handheld electronic device may be referred to as a wireless device, a handheld device, phone or a smart phone, for example.

Figure 1:
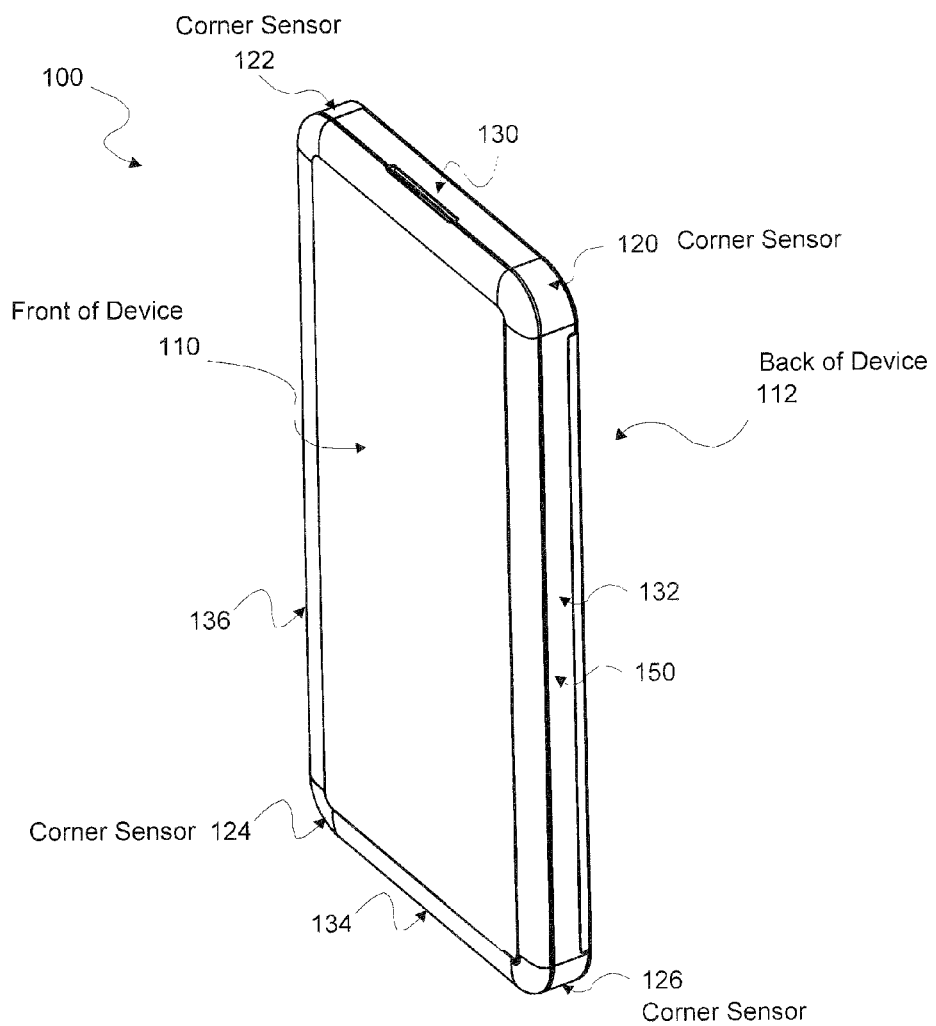
FIG. 1 is an angle view of a handheld electronic device with sensors located on one or more corners of the device.

To aid the reader in understanding of the functions and structure of the handheld device, reference will now be made to FIG. 1. FIG. 1 is an angle view of a handheld device 100 that includes corner sensors located on one or more corners of the device. In some systems, the handheld device 100 may be a wireless phone, for example, a smart phone. However, the system is not limited to any specific type of handheld electronic device and may be, for example, a tablet computer, a gaming device or a media device. The handheld device 100 may include a front 110, a back 112 and sides 130, 132, 134 and 136.

The front 110 of the handheld device 100 may comprise a user interface, for example, a display and one or more input sensors. For example, a mechanical key pad for entering alpha and/or numeric characters, a touch-screen display and/or a thumb-wheel may be located on the front 110 of the device. Also, various push buttons, rocker switches, track balls, optical sensors, voice sensors, pressure sensors or touchpads, may be equipped on the handheld device 100 to enter information or control its operation. The system is not limited with regard to any specific types of user interfaces that may be located on the handheld device 100.

The sides 130, 132, 134 and 136 of the handheld device 100 may be located between the front 110 and the back 112 of the device. The sides 130, 132, 134 and 136 may be part of a case edge of the handheld device 100. In some systems all or a portion of one or more of the sides 130, 132, 134 and/or 136 may be covered in a conductive material such as aluminum. However, the system is not limited in this regard.

Although FIG. 1 represents the handheld device 100 as a rectangular box, with flat sides and rounded corners, the system is not limited in this regard and may comprise any suitable form factor for a handheld device. For example, any of the front, sides or back of the device may be curved. Also the corners or edges between any of the front, the back and/or the sides of the device may be curved and/or may be angular.

The handheld device may have a clam shell form factor or comprise an extendable keypad. In one example, the handheld device 100 may be shaped to fit comfortably in a user's hand while the user controls or manipulates a user interface and/or input sensors such as one or more corner sensors 120, 122, 124 and 126. In another example, the front 110 of the handheld device 100 may comprise a flat touch-screen that may extend to the edges of the device or may wrap around to one or more sides 130, 132, 134 and 136 of the device.

The corner sensors 120, 122, 124 and 126 may be located on or near where two of the sides 130, 132, 134 and 136 meet with the front 110 and/or the back 112 of the handheld device 100. The corner sensors 120, 122, 124 and 126 may be flat, curved and/or angular. The corner sensors may face in any direction on the corners of the device 100. In some systems, a corner sensor may wrap from a first to a second side, for example, the corner sensor 120 is shown in FIG. 1 as wrapping from side 130 to side 132. The corner sensors 120, 122, 124 and 126 may wrap from one or more of the sides 130, 132, 134 and 136 onto the front and/or onto the back at or near the corners of the device 100. In this manner, the corner sensors 120, 122, 124 and/or 126 may be equipped on a corner of a case edge of the handheld device 100.

Although FIG. 1 illustrates the handheld device 100 equipped with four corner sensors 120, 122, 124 and 126, the device may have fewer corner sensors. For example a handheld device 100 may have a top left corner sensor 122 and a top right corner sensor 120. In one exemplary use case, the handheld device 100 may have a smart phone form factor and may be held in one hand with thumb and index finger used to control the top right and left corner sensors 120 and 122. For a right handed person, the right hand thumb may operate the right top corner sensor 120 and the right hand index finger may operate the left top corner sensor 122. Alternatively, the handheld device 100 may be held in two hands and the corner sensors may be controlled with both hands. In some user modes, all four of the corner sensors 120, 122, 124 and 126 may be activated for control of the handheld device 100.

The handheld device 100 may be configured for use in different positions or orientations, such as portrait or landscape mode. The device may be rotated upside down or sideways and the corner sensors may be configured for use according to a current position. Different corner sensors may be activated when the device is oriented in different positions. The configuration may be adapted automatically by the device and/or may be set based on user input. The handheld device 100 may have internal sensors such as a gyroscope to enable configuration of the corner sensors 120, 122, 124 and/or 126 according to spatial orientation of the device 100.

In some systems, the corner sensors 120, 122, 124 and 126 may be used to trigger or control a specified function or may provide quick access to an often used function. For example, the corner sensors may be configured to increase or decrease volume or enable and disable a speaker function. In some systems the corner sensors may be utilized for a broader range of control. For example, the corner sensors 120, 122, 124 and/or 126 may provide mouse functionality or interaction with objects displayed on a screen. The corner sensors 120, 122, 124 and/or 126 may enable navigation control, character entry, image control and various forms of communication. In some systems, the corner sensors 120, 122, 124 and/or 126 may be utilized for gaming control. The corner sensors are not limited to any specific application and may be utilized for any suitable application.

The corner sensors 120, 122, 124 and 126 may comprise any suitable type of sensor or control mechanism for input by a user to the device 100. For example, one or more of the corner sensors 120, 122, 124 and 126 may comprise tactile or touch sensors which may be utilized to enter information or trigger a function within the handheld device 100. In some systems the corner touch sensors 120, 122, 124 and/or 126 may comprise a miniature track pad located at or near the corners of the handheld device 100. For example, a smart phone may be equipped with track pads one or more corners of the device 100. The corner sensor track pads may be flat or curved. The corner sensor track pads may sense motion or movement along the surface of the track pad by a finger or thumb, for example. The corner sensor track pads may be fully functioning or may be limited in function. For example, the corner sensor track pads 120, 122, 124 and/or 126 may detect movement over x, y planar coordinates of the pad or may be limited to detecting movement in a linear fashion such as forward and/or backward gestures by a user's thumb or finger. In some systems, the corner sensor track pads 120, 122, 124 and/or 126 may detect and register a tap or click gesture which may trigger an operation in the handheld device 100.

One or more of the corner sensors 120, 122, 124 and 126 may comprise a pressure sensor that may be utilized to enter information or a control operation in the handheld device 100. In some systems a pressure sensor may be combined with the touch sensor in one or more of the corner sensors. For example, one or more of the corner sensors 120, 122, 124 and 126 may detect movement and pressure individually and/or simultaneously. The corner sensors 120, 122, 124 and 126 may detect one or more pressure gestures, for example, a pressure sensor may register an instance of applied pressure such as a click when a user applies at least a specified level of pressure to one or more of the corner sensor. Moreover, a prolonged applied pressure gesture may be detected. In some systems various levels of pressure such as a high, medium or light pressure may be detected. A continuously varying pressure level may also be detected. In some systems, a user may apply pressure simultaneously to two or more of the corner sensors 120, 122, 124 and 126 which may be registered by the handheld device 100 as a squeezing gesture.

The corner sensors 120, 122, 124 and 126 are not limited to any specific sensor or input technology and may comprise any suitable sensors or input mechanisms such as a push-button, a rocker-switch, track-ball, touch-pad, touch-screen, thumb-wheel or an optical sensor to enter information or control operation of the handheld device 100. However, in some systems, mechanical switches, such as a rocker-switch on the side of a phone casing that would be used for volume up and down control may be replaced by touch or pressure corner sensors. For example, a user may control volume by running a thumb in one direction or another on a trackpad located on a top corner of a handheld device 100.

One or more corner sensors 120, 122, 124 and 126 may be activated for use or may be deactivated or disabled. Deactivating one or more of the corner sensors 120, 122, 124 and 126 may prevent unintentional input to the device which may be entered via the corner sensors. For example, deactivating all of the corner sensors may prevent unintentional sensor input in instances when the handheld device 100 may come in contact with other objects, for example, in a purse or a pocket. Also, one or more of the corner sensors 120, 122, 124 and 126 may be disabled when they are not needed to control the handheld device 100. This may prevent a user from mistakenly contacting or touching one or more of the corner sensors 120, 122, 124 and 126 and inputting unintentional or false information.

In some systems, the handheld device 100 may automatically detect when it is being held and as a result may enable one or more appropriate corner sensors 120, 122, 124 and 126 for use. It may detect that it is not being held and as a result, may determine to disable one or more of the corner sensors 120, 122, 124 and 126. Various surfaces of the handheld device 100, for example, any of: one or more of the sides or edges 130, 132, 134 and 136, one or both of the front 110 and the back 112 and one or more of the corners 120, 122, 124 and 126 of the device 100 may comprise sensors 150 that may be operable to detect human touch. Input from one or more of the human touch sensors 150 may be utilized to determine when the device 100 is being held. Exemplary sensors 150 that may be utilized to determine when the handheld device 100 is being held may comprise resistance sensors, conductance sensors and/or one or more capacitance sensors. For example, an array of capacitance touch sensors 150 may be located on specified portions of the surface of the handheld device 100. A user's body capacitance may be utilized by the capacitance touch switches to detect when the handheld device 100 is being held or touched or when it is not being held. For example, a pattern of human touch detected via sensors 150 on any of: one or more of the surfaces such as the sides or edges 130, 132, 134 and 136, one or both of the front 110 or the back 112 and one or more of the corners 120, 122, 124 and 126 of the device may be registered by device software to indicate that the device 100 is being held. Similarly, one or more electroresistive sensors 150 may comprise one or more resistance touch switches that may detect when the device is being held. In instances when the device 100 senses that it is being touched by a human or is being held in a hand, it may enable one or more appropriate corner sensors 120, 122, 124 and 126 for use, for example, in accordance with how the handheld device 100 and/or the corner sensors 120, 122, 124 and 126 may be configured for use. In some systems, one or more modes of use for one or more of the corner sensors 120, 122, 124 and 126 may be automatically configured based on input registered from the human touch sensors 150 on the surfaces and/or corners of the handheld device 100. For example, simply touching the device on one of the side surfaces 130, 132, 134 and 136 may activate the corner sensors 120, 122, 124 and 126. In another example, touching the device on one or more of the side surfaces 130, 132, 134 and 136 and clicking one or more of the corner sensors 120, 122, 124 and 126 may activate one or more of the corner sensors 120, 122, 124 and 126. However the system is not limited with regard to any specific method for activating one or more of the corner sensors.

In some systems, a user may intentionally activate or deactivate one or more of the corner sensors 120, 122, 124 and 126. Some examples of activation may include, contacting any specified external sensor, providing voice input; tapping a display icon or any other suitable device input may be utilized to enable and/or disable the one or more corner sensors 120, 122, 124 and 126. For example, while the hand-held device 100 is powered-up, a user may quickly depress a power-up button on the casing of the device to deactivate or to activate one or more of the corner sensors 120, 122, 124 and 126. Similarly, the user may intentionally configure one or more modes of use of the one or more corner sensors 120, 122, 124 and 126.

In an exemplary operation, the handheld device 100 may be a smart phone 100 with touch sensitive and/or pressure sensitive miniature trackpad corner sensors 120 and 122 embedded in two top rounded corners of the smart phone 100 case edge. In some systems, physical momentary rocker switches and push switches may be eliminated from the sides or edges 132 and 136 of the smart phone 100.

The smart phone 100 may be configured for a right handed or left handed person. For example, the smart phone 100 may be configured for a right handed person where the right upper corner sensor 120 may be operable to support gestures such as thumb pressure, thumb click and/or thumb wheel motion which may be bidirectional. The left upper corner sensor 122 may be operable to support gestures such as index finger pressure and/or index finger click. Simultaneous thumb and index finger pressure may be interpreted as, for example, a squeeze or pressure gesture, a hold and click operation or a hold and drag operation. The smart phone 100 may comprise a metallic or conductive case edge, such as aluminum casing, on one or more of the sides 130, 132, 134 and 136. The conductive edge casing may comprise the touch sensors 150 and may be sensitive to human touch based on resistance touch sensing technology which may enable the smart phone 100 to determine when it is being held in a hand. In this regard, the smart phone 100 may be operable to distinguish between being touched by a human and being touched by an inanimate object when carried in a pocket or purse. The smart phone 100 may automatically enable the corner sensors 120 and 122 for use when the human touch sensor 150 detects that it is being held in a hand. It may automatically deactivate the corner sensors when it does not detect that it is being held. Alternatively, the corner sensors 120 and 122 may be activated or deactivated by intentional user input via an interface of the device 100. In this manner, the corner sensors 120 and/or 122 may more than replace current physical switch functionality equipped on smart phone side panels and may add fuller functioning capability via corner sensors with touch-pad sensors, pressure sensors and simultaneous multi-corner sensing for detection of pressure or squeeze gestures. The new smart phone 100 corner sensors 120 and 122 may be utilized for various applications and gaming.

Figure 2:
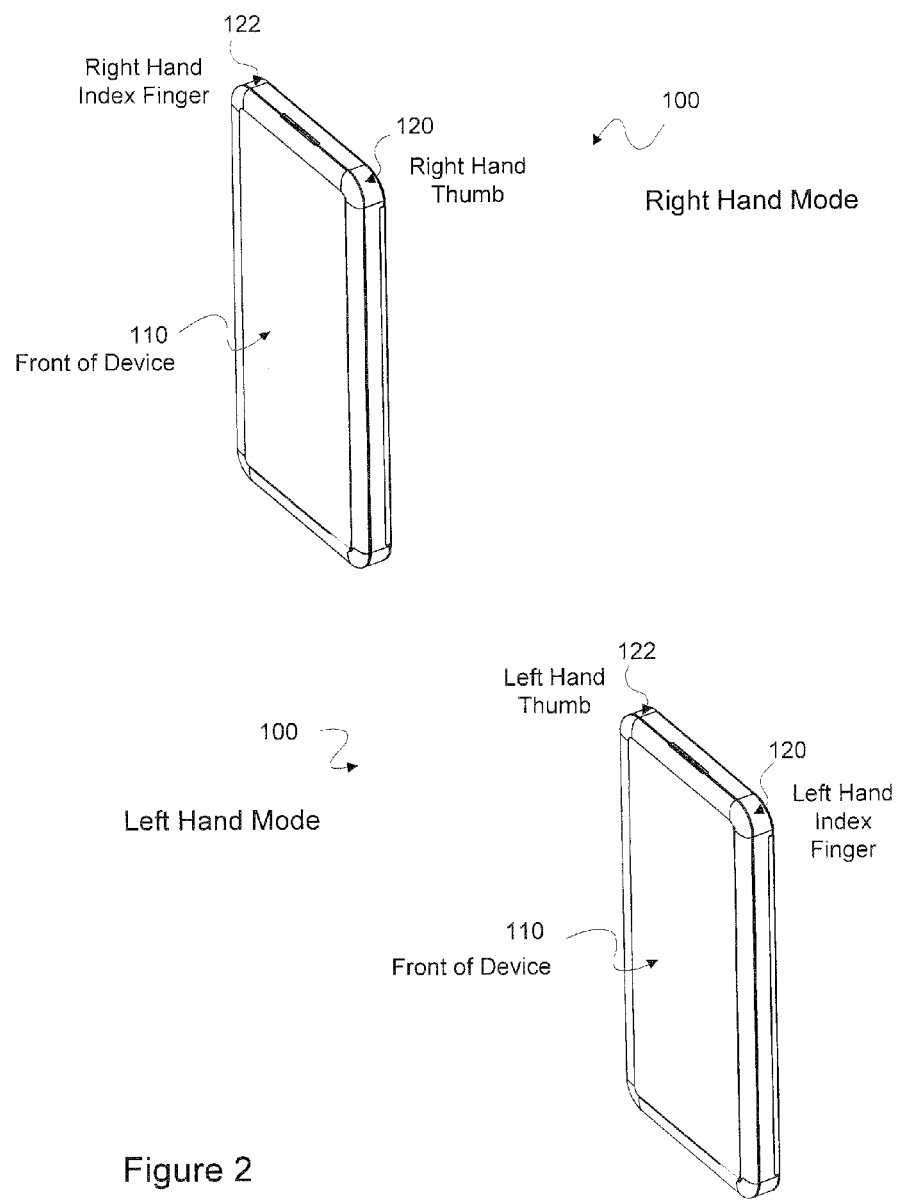
FIG. 2 is a diagram of a handheld electronic device with corner sensors utilized in a right hand mode or in a left hand mode.

FIG. 2 is a diagram of the handheld electronic device 100 with corner sensors utilized in a right hand mode and in a left hand mode. The electronic device 100 may be configurable for a handheld mode which may be referred to as a handedness mode. For example, the electronic device may be used in a one handed mode, a right handed mode, a left handed mode or a two handed mode. For example, the handheld device 100 may be configured during set-up by a user, at a point of sale or in a factory. Moreover, the handheld electronic device 100 may be configurable at a time of use by a user. The device 100 may configure or reconfigure itself based on an application currently active in the device. In some systems, the device may be operable to sense how it is being held and/or which hand the device is being held in and may be operable to adapt or self-configure itself for one hand mode, right hand mode, left hand mode or two handed mode, accordingly. The system is not limited with regard to any specific method for configuring a handedness mode and any suitable method may be utilized for handedness configuration.

In some systems, the corner sensors 120, 122, 124 and 126 may be configured to operate according to a left hand mode or a right hand mode. For example, in a right hand mode, the handheld electronic device 100 may be held in the right hand with the back of the device 112 towards the palm of the right hand and the thumb of the right hand may manipulate a top right corner sensor 120. In this manner, a display or front 110 of the device 100 may face a user. The index finger of the user's right hand may reach around from the back of the device and may manipulate the top left corner sensor 122 of the device. Alternatively, in a left hand mode, the handheld electronic device may be held in the left hand with the back of the device 112 towards the palm of the left hand and the thumb of the left hand may manipulate the top left corner sensor 122 of the device. The front 110 of the device or display may be facing the user. The index finger of the left hand may reach around from the back of the device and may manipulate the top right corner sensor 120 of the handheld electronic device 100.

The top right and top left corner sensors 122 and 120 may work differently according to how the device is held and/or which finger or thumb may be utilized to manipulate the respective sensors. In some hand positions, a thumb may be more agile than an index finger and may be able to maneuver or manipulate a corner sensor with greater ease and control than the index finger. In other positions, the index fingers may have greater facility than the thumbs. Some gestures utilized by the thumb and the index finger may be the same for both top corner sensors and some gestures may be different for the thumb and index finger. For example, in right hand mode, the handheld device 100 may be cradled in the right hand. The right hand thumb may be able to manipulate a top right corner touch and/or pressure sensor 120 in more directions or with greater sensitivity than the index finger may be able to manipulate the top left corner sensor 122. Similarly for a device 100 held in the left hand mode, the left hand thumb may perform with greater facility than the left hand index finger when manipulating corner sensors 122 and 120.

In right hand mode, the top right corner sensor 122 may track various thumb movements, for example, movement in a forward direction, in a backward direction and/or bidirectional thumb movements. The thumb may move forward or backward on a corner sensor track pad to register a single input. In some systems, this may be an easy way to implement a selection or to activate a function. In one example, bidirectional movement may provide binary input. In another example, the thumb may move forward and backward on a track pad to register variable positions in a linear dimension. This type of gesture may easily activate volume up and volume down control, for example. In another example, the thumb may move in any direction on a touch and/or pressure sensor to register input across variable positions in a two dimensional coordinate system.

In an exemplary right hand mode, the right hand thumb may be utilized on the top right corner sensor 120 to control a cursor on a screen or may enter any kind of gesture or signal that could otherwise be input via a mouse. The system may be operable to register a tap on the corner sensor 120 by the thumb. In some systems, a thumb may perform a click gesture. For example, a pressure sensor on the right corner sensor 120 may detect a level of pressure by the thumb that may indicate a click. The click may trigger functions on the handheld device 100 in a similar manner or substantially the same way as a mouse click may trigger functions on a computer or lap top. Furthermore, movement in two dimensions by a thumb on a top corner sensor 120 may include a rotational motion, for example, the corner sensor 120 may be configured to register input as a thumb wheel where the thumb may rotate in one or two directions to provide input relative to choices provided on a display screen.

In right hand mode, the index finger corner sensors 122 on the top left corner of the device 100 may be configured to work in the same way as the thumb sensors 120 of the top right corner of the device or in a different way. The top left corner sensors 122 as controlled by the index finger of the right hand may operate with a reduced number of movements or gestures relative to the thumb control on the right corner sensor 120. For example, the corner sensor 120 on the top right may support a thumb wheel gesture while the top left corner sensor 122 as manipulated by the right hand index finger may not accept wheel or rotational motion input because of a more limited range of motion by the index finger. However, the system is not limited to any specific differences in top corner sensor controls.

In some systems, both of the top corner sensors 120 and 122 may be controlled in a symmetrical manner where each corner touch and/or pressure sensor 120 and 122 operates in the same way. Furthermore, in some systems the gestures available to the thumb and index finger configuration may be swapped based on the appropriate handedness at a particular time or for a particular user. Moreover, in some systems the corner sensors may be made based on different technologies. For example one corner may comprise a touch sensor and a pressure sensor while the other corner may have only a touch sensor. Any suitable sensors or any combination of sensor types may be utilized as the corner sensors 120, 122, 124 and 126. Corner sensors may include a touch sensor, a track-pad, a pressure sensor, or in some systems, a mechanical sensor such as a rocker switch, a push button, a wheel, or any other suitable input sensor.

Figure 3:
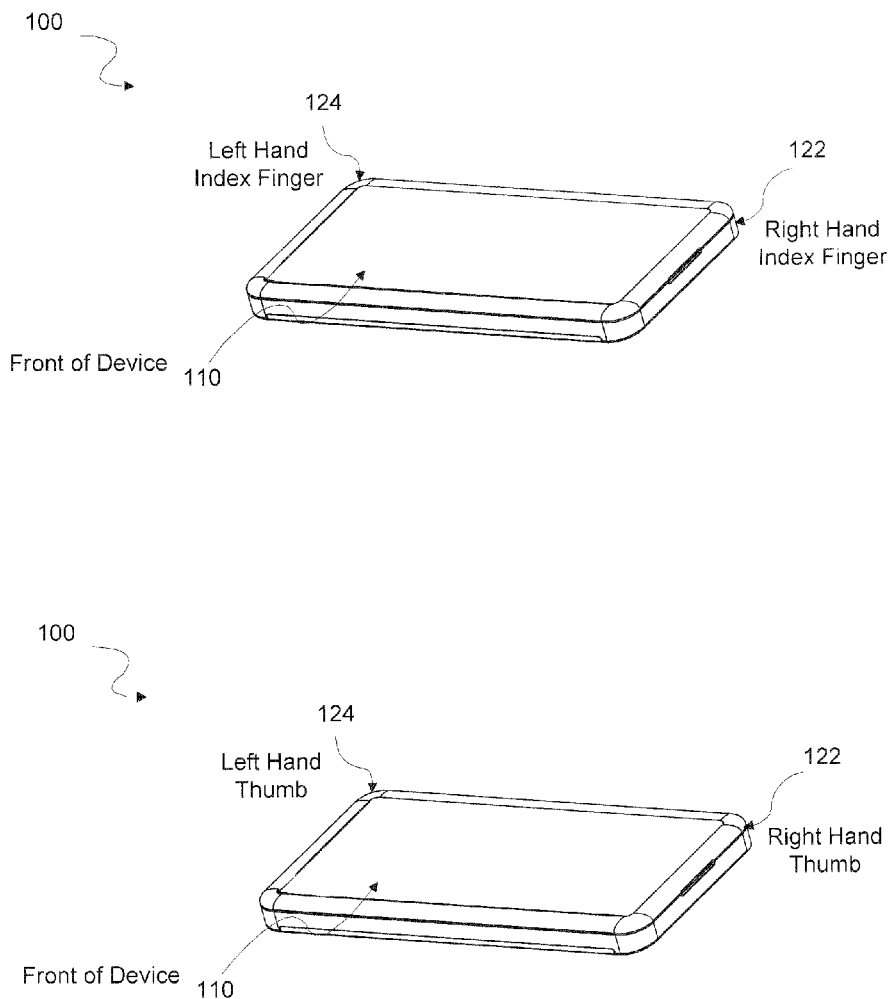
FIG. 3 is a diagram of a handheld electronic device with corner sensors utilized in a two handed mode.

FIG. 3 is a diagram of the handheld electronic device 100 with corner sensors 124 and 122 utilized in a two handed mode. In some instances, the handheld device 100 may be held in both hands by a user. In one example, with the display or front 110 of the device 100 facing the user, the user may rest the bottom of the device on their thumbs and rest the back 112 of the device on their two middle fingers while using their two index fingers to control top corner sensors 124 and/or 122. In another exemplary handheld mode, the user may use other parts of their hands such as their palms to hold the device while manipulating corner sensors 124 and/or 122 with their thumbs and/or any of their available fingers. The way in which a user holds the device may depend on the dimensions and/or shape of the device and/or a user's preference. For example, a small smart phone may be held in a different position than a tablet computer. In two handed mode, the corner sensors 124 and 122 on the top two corners may work symmetrically or asymmetrically. For example, two handed mode may be configured for asymmetrical gestures or corner sensors described with respect to FIG. 2 or for the gestures or corner sensors for both of the top corner sensors 124 and 122. The system is not limited with regard to how many corner sensors are equipped or activated in the handheld device 100.

Figure 4:
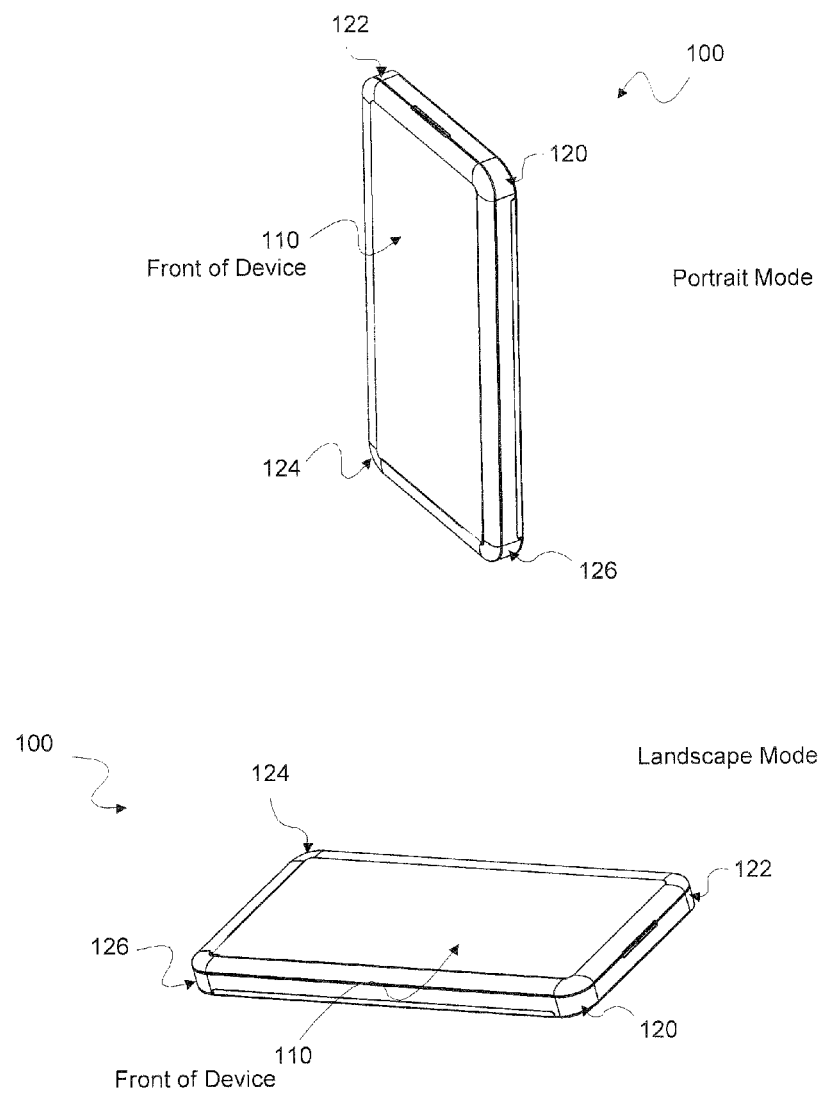
FIG. 4 is a diagram of a handheld electronic device with corner sensors as held in a portrait orientation and as held in a landscape orientation.

FIG. 4 is a diagram of the handheld electronic device 100 with corner sensors 120, 122, 124 and 126 as held in a portrait orientation and as held in a landscape orientation. In some systems, the handheld electronic device 100 may be utilized in a plurality of spatial orientations. For example, the device may be turned on one side or another or may be turned upside-down. The handheld electronic device 100 may comprise an internal sensor module that may detect spatial orientation of the device (described with respect to FIG. 10). For example, a gyroscope may be utilized for this purpose. In some systems, output from the spatial orientation module may trigger spinning of the display to remain consistent with a viewer's perspective. For example, the view may turn a display from portrait mode to landscape mode and the spatial orientation module may trigger spinning of the display from portrait mode to landscape mode, however, the handheld device is not limited in this regard and may not comprise a display. In some systems, output from the spatial orientation module may be utilized to determine which of the corner sensors 120, 122, 124 and 126 to activate and/or how the corner sensors 120, 122, 124 and 126 may be configured. For example, the handheld electronic device 100 may be equipped with corner sensors on all four corners of the device. The device 100 may be configured for use in a right hand mode and may be held in portrait mode in a user's right hand. The top right corner 120 of the device, when held in portrait mode, may be configured for manipulation by the right hand thumb and the top left corner may be configured for manipulation by the right hand index finger. When the device is rotated for example, from a portrait mode to a landscape mode the top right and left corner sensors may be populated by physically different corner sensors 124 and 122. Similarly the device may be rotated 180° upside-down. Output from the spatial orientation module or gyroscope (described with respect to FIG. 10) may be utilized to enable activation of the new top right and/or top left corner sensors 124 and 122, and may disable the new bottom right and left corner sensors 126 and 120. Furthermore, output from the spatial orientation module may be utilized to configure the new top left and right corner sensors according to right hand mode or left hand mode. In one exemplary use case, a user may change from operation in one spatial orientation to another and at the same time change which hand or hands they use to hold the device 100. In this regard, the user may begin using the handheld device 100 in portrait mode and right hand mode. The user may turn the device 100 to landscape mode and may also switch to using two hands to hold the device while their two index fingers control the top left and right corner sensors 124 and 122. In this example, the handheld device 100 may be appropriately reconfigured for the new spatial orientation and/or the new handedness mode. Output from the spatial orientation module may enable automatic self-reconfiguration of the top left and right corner sensors by the device 100 and/or a user may provide input to the device to implement the re-configuration process. The handheld device 100 is not limited with regard to which spatial orientation or which handedness mode may be re-configured in newly activated corner sensors.

Figure 5:
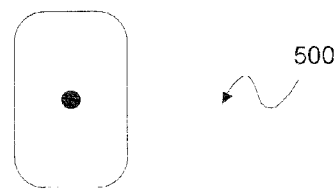
FIG. 5 is diagram of a corner sensor on a handheld electronic device with a single click zone utilized for input to the device.

FIG. 5 is diagram of a corner sensor 500 equipped on a handheld device 100 with a single zone for detecting user tap or click gestures input to the device 100. The corner sensor 500 may detect binary states. The corner sensor 500 may comprise any suitable sensor such as a touch sensor, pressure sensor or push button. In some systems the corner sensor 500 may also be operable to detect pressure or pressure levels. Pressure corner sensors may comprise piezoresistive, piezoelectric, capacitive, electromagnetic or optical sensors or gauges, however, the system is not limited to any specific type of pressure sensor.

Figure 6:
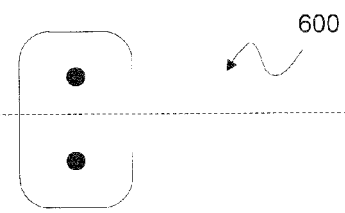
FIG. 6 is diagram of two click zones utilized for input to a corner sensor of a handheld electronic device.

FIG. 6 is diagram of a corner sensor 600 equipped on a handheld device 100 with two zones utilized for detecting tapping or clicking gestures input by a user to a handheld electronic device. The corner sensor 600 may comprise a track-pad, a touch sensor and/or a pressure sensor, for example. In some systems the corner sensor 600 may be operable to detect pressure and/or pressure levels.

Figure 7:
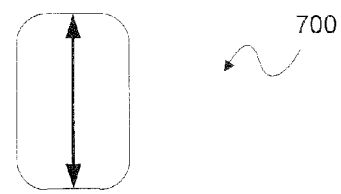
FIG. 7 is diagram of forward and backward or bidirectional motion utilized as gestures for input to a corner sensor of a handheld device.

FIG. 7 is diagram of a corner sensor 700 that is operable to detect and/or register one dimensional movement. For example, forward, backward and/or bidirectional motion may be utilized as gestures for input to the corner sensor 700. The corner sensor 700 may comprise a track-pad, for example. In some systems the corner sensor 700 may also be operable to detect pressure or pressure levels.

Figure 8:
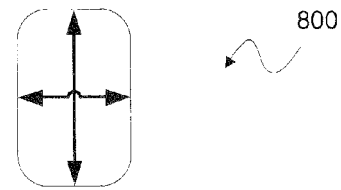
FIG. 8 is a diagram of a corner sensor that is operable to detect and/or register movement in at least two dimensions.

FIG. 8 is a diagram of a corner sensor 800 that is operable to detect and/or register movement in at least two dimensions, for example, movement in any direction over a flat or curved surface of a track-pad. In some systems the corner sensor 800 may also be operable to detect pressure.

Figure 9:
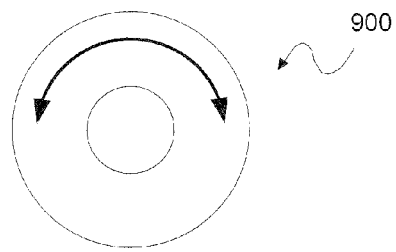
FIG. 9 is a diagram of a corner sensor that may detect wheel or rotational motion utilized as a gesture for input to a corner sensor.

FIG. 9 is a diagram of a corner sensor 900 that may be operable to detect wheel or rotational motion utilized as a gesture for input to a corner sensor of a handheld device. In some systems the corner sensor 900 may also be operable to detect pressure.

Figure 10:
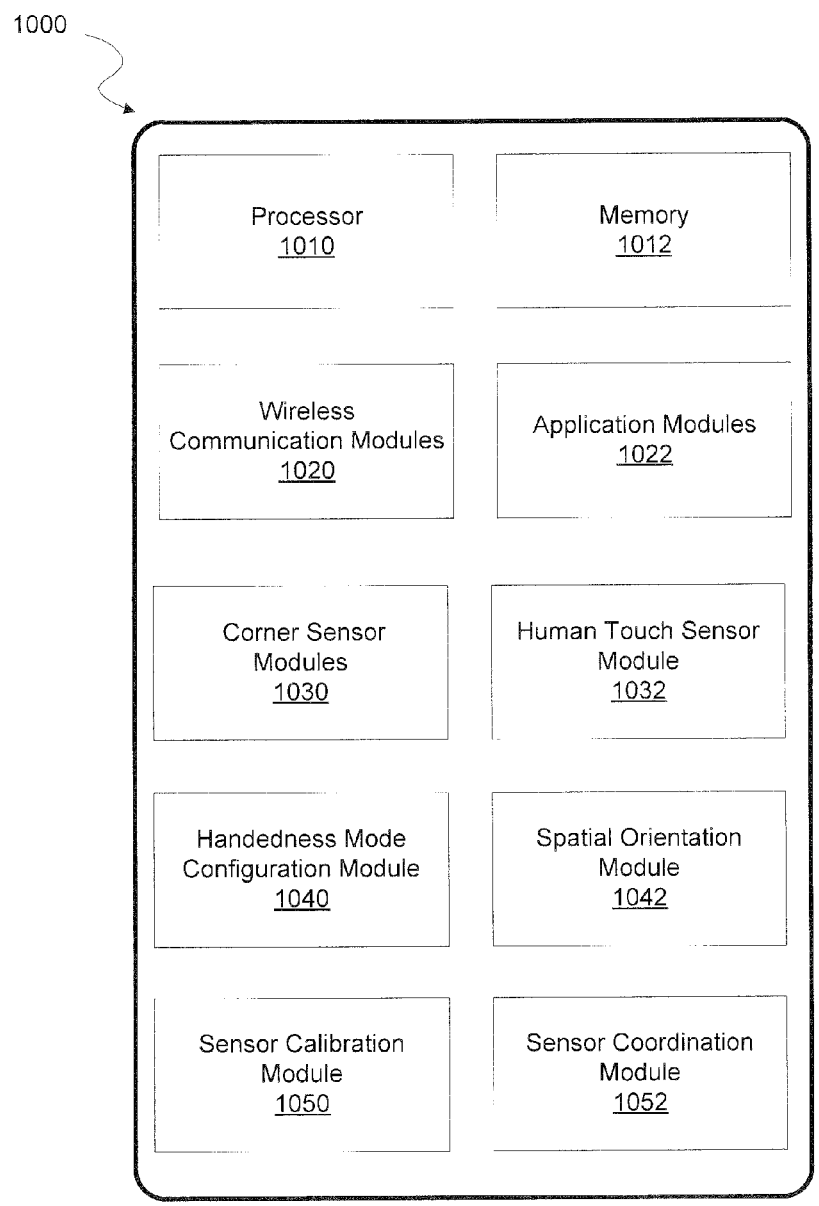
FIG. 10 is an illustration of an exemplary handheld electronic device that may be controlled using one or more corner sensors.

FIG. 10 is an illustration of an exemplary handheld electronic device 1000 that may be controlled using one or more corner sensors. The handheld device 1000 may be similar or substantially the same as the handheld device 100 and may be equipped with one or more of the corner sensors 120, 122, 124 and 126. In some systems the handheld device 1000 may be equipped with a human touch sensor 150 that may enable and/or disable the one or more corner sensors 120, 122, 124 and 126. The handheld electronic device 1000 may comprise a processor 1010 and memory 1012. Also, the device 1000 may comprise wireless communications modules 1020, applications modules 1022, corner sensor modules 1030, a human touch sensor module 1032, a handedness configuration module 1040, a spatial orientation module 1042, a sensor calibration module 1050 and a sensor coordination module 1052. Each of these processors and modules in the handheld device 1000 may comprise suitable logic, circuitry, interfaces and/or code that may be operable to support control of the handheld device 1000 by the corner sensors 120, 122, 124 and 126 and/or the human touch sensor 150.

The processor 1010 may comprise one or more special purpose and/or general purpose processors. The processor 1010 may be operable to execute instructions and process data that may be stored in the memory 1012. For example, the processor 1010 may be operable to control various functions and modules such as network interfaces, user interfaces and various applications supported by the handheld device 1000. The memory 1012 may include a computer readable medium, for example, flash memory, read only memory (ROM) and volatile storage such as RAM. The processor 1010 may perform operating system functions and execution of software applications and may control basic device operations such as voice or data communications.

In some systems, the handheld device 1000 may comprise one or more wireless communication modules 1020. The wireless communication modules 1020 may comprise baseband and radio subsystems including receiver, transmitter and one or more antennas. The wireless communication modules 1020 may be operable to perform communication based on any suitable wireless communication technologies, for example, one or more of cellular, satellite, WLAN and Bluetooth technologies and in any suitable wide area, local area and/or personal area network. The handheld device 1000 is not limited with regard to any specific wireless technology. In some systems, the handheld device 1000 may not comprise a wireless communication module.

The handheld device 1000 may comprise one or more application modules 1022 that may be operable to perform a plurality of functions such as still and/or video capture, display and communication, multi-media processing, internet browser functions, geo-location, wireless communications and gaming which may comprise high speed internet gaming, for example. The handheld device 1000 is not limited with regard to which applications it may support.

The handheld device 1000 may comprise corner sensor modules 1030 that may be operable to receive and/or interpret user input received via one or more of the corner sensors 120, 122, 124 and 126. The corner sensor modules 1030 may be operable to communicate the user input information to higher level modules, for example, an appropriate application or function module. Some exemplary functions that may utilize the user input received via the corner sensors may include volume control in a phone or multi-media application, entering text in a message, interacting with a graphical user interface and gaming.

Each corner sensor may be monitored by one or more corner sensor modules 1030 utilizing lower level hardware and/or software components or drivers. For example, track pad movement gestures, clicking or applied pressure on a corner sensor may be monitored by a lower level software component of the corner sensor module 1030. Each available corner sensor may provide input to a lower level software component. A higher level software component which may comprise the sensor coordination module 1052 may receive output from multiple corner sensor modules 1030 for multiple corner sensors. In this manner, the sensor coordination module 1052 may be operable to determine when more than one corner sensor is engaged by a user and may interpret simultaneous input from multiple corner sensors. For example, simultaneous pressure by a thumb on one corner sensor 120 and by an index finger on another corner sensor 122 may be detected and interpreted as a squeeze gesture. In some systems, the level of pressure being applied may be registered. This type of gesture may be utilized in gaming applications, for example. The sensor coordination module 1052 may be operable to determine any suitable combination of corner sensor input.

In some systems, the handheld device 1000 may comprise a sensor calibration module that may be utilized to calibrate user input at one or more of the corner sensors 120, 122, 124 and 126. For example, the device 1000 may be operable to calibrate sensitivity to pressure applied by a user to determine light, medium or high pressure. In this regard, the device 1000 may be configured for a calibration mode and may prompt a user to apply a light pressure, a medium pressure and high pressure to one or more of the corner sensors 120, 122, 124 and 126 so that the device can properly interpret the user's input. Similarly movement gestures on a track-pad may be calibrated.

The human touch sensor module 1032 may receive input from the sensors 150 that may detect human touch. The human touch sensor module may be operable to determine when the device 1000 is being held. In instances when the device 1000 senses that it is being touched by a human or being held in a hand, it may enable usage of one or more of the appropriate corner sensors 120, 122, 124 and 126 in accordance with how the handheld device 1000 and/or the corner sensors 120, 122, 124 and 126 may be configured. In some systems, a pattern of human touch detected via sensors 150 may be registered by the human touch sensor module 1032 which may be utilized to configure one or more of the corner sensors, for example, with regard to handedness or spatial orientation. Information from the human touch sensor module 1032 may be communicated to the handedness configuration module 1040, the spatial orientation module 1042 and/or the sensor coordination module 1052 to enable automatic configuration of the corner sensors 120, 122, 124 and/or 126.

The handedness configuration module 1040 may be operable to determine how the handheld device 1000 is being held and may configure one or more of the corner sensors 120, 122, 124 and 126 appropriately. For example, the handedness configuration module may determine to configure the device 100 for use in a single handed mode, a right handed mode, a left handed mode or two handed mode. The handedness configuration module may receive configuration information based on intentional user input or may automatically determine a handedness mode based on information from any of the sensors in the device 100, for example, the human touch sensors 150, the corner sensors 120, 122, 124 and 126 or other user interface sensors. The handedness configuration module 1040 may configure one or more of the corner sensors 120, 122, 124 and 126 based on a level of dexterity of a user's fingers or thumbs that may be utilizing the respective corner sensors. For example, as the handheld device 1000 is held in right handed mode, the thumb may be more dexterous than an index finger of the right hand and the corners sensors corresponding to each digit may be configured to operate differently based on the dexterity of the respective digits.

The spatial orientation module 1042 may be operable to determine in which direction the handheld device 1000 is oriented. In some systems, the spatial orientation module may receive input from a gyroscope which may be equipped within the device 1000. For example, the device 1000 may determine that it is presently configured for right handed mode and is also being held in a vertical position or portrait mode. Sensor coordination module 1052 may configure the top two corner sensors 120 and 122 for right handed mode use and may disable the corner sensors 124 and 126.

The sensor coordination module 1052 may receive information from a plurality of sources to determine which of the one or more corner sensors 120, 122, 124 and 126 to activate and/or how they should be configured for use. The sensor coordination module 1052 may activate one or more of the corner sensors and configure them in a determined mode. In some systems, a user may configure the corner sensors or a programmed or default setting may be utilized based on an application in use. Alternatively, a portion or the entire configuration for the corner sensors 120, 122, 124 and/or 126 may be determined automatically. For example, the coordination module 1052 may receive information from one or more of the handedness configuration module 1040, the spatial orientation module 1042, the human touch sensor module 1032, the corner sensor modules 1030 and/or other sources available to the handheld device 1000 and may determine which of the one or more corner sensors 120, 122, 124 and 126 to activate and/or how they should be configured for use.

The above described systems may be embodied in many technologies and many configurations. While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for controlling an electronic device, the method comprising:
   receiving input from two or more corner sensors, each of said two or more corner sensors being located at a corner of a case edge of said electronic device, wherein:
      each of said two or more corner sensors is configured to receive one or more user gestures that are determined based on one or both of:
         a holding position of said electronic device for utilizing said corner sensors, and
         a spatial orientation of said electronic device; and
      controlling one or more functions of said electronic device based on said input received from said two or more corner sensors;
   wherein said electronic device is operable to detect simultaneous input from said two or more corner sensors to register one or more of a squeeze gesture, a hold and click gesture and a hold and drag gesture.

2. The method according to claim 1, wherein said holding position is based on single handed use, right handed use, left handed use or use by both hands.

3. The method according to claim 1, wherein at least two of said two or more corner sensors is configured for use by a specified digit.

4. The method according to claim 1, wherein said spatial orientation comprises portrait mode or landscape mode.

5. The method according to claim 1, wherein each of said two or more corner sensors comprises one or more of a touch sensor, an optical sensor and a pressure sensor.

6. The method according to claim 1, comprising detecting the user gestures on said two or more corner sensors including one or more of position of a touch, duration of a touch, movement of a touch over a corner sensor surface, a wheel motion, a linear motion, a pressure hold, a tap, pressure levels and click gestures.

7. The method according to claim 1, wherein at least one of said two or more corner sensors is operable to detect simultaneous touch gesture and pressure gesture input.

8. The method according to claim 1, comprising detecting when said electronic device is being held or touched by a user and disabling one or more of said two or more corner sensors when said electronic device is not being held or touched by a user.

9. The method according to claim 1, wherein said holding position of said electronic device for utilizing said two or more corner sensors includes a right hand mode and a left hand mode and said user gestures that are determined based on said holding position include thumb pressure, thumb click, bidirectional thumb motion, thumb wheel motion, index finger pressure, index finger click, simultaneous thumb and index finger squeeze, simultaneous thumb and index finger hold and click and simultaneous thumb and index finger hold and drag.

10. An electronic device comprising one or more processors configured to:
receive input from two or more corner sensors, each of said two or more corner sensors being located at a corner of a case edge of said electronic device, wherein:
each of said two or more corner sensors is configured to receive one or more user gestures that are determined based on one or both of:
a holding position of said electronic device for utilizing said corner sensors, and
a spatial orientation of said electronic device; and
control one or more functions of said electronic device based on said input received from said two or more corner sensors;
wherein said electronic device is operable to detect simultaneous input from said two or more corner sensors to register one or more of a squeeze gesture, a hold and click gesture and a hold and drag gesture.

11. The electronic device according to claim 10, wherein said holding position is based on single handed use, right handed use, left handed use or use by both hands.

12. The electronic device according to claim 10, wherein at least one of said two or more corner sensors is configured for use by a specified digit.

13. The electronic device according to claim 10, wherein said spatial orientation comprises portrait mode or landscape mode.

14. The electronic device according to claim 10, wherein each of said two or more corner sensors comprises one or more of a touch sensor, an optical sensor and a pressure sensor.

15. The electronic device according to claim 10, wherein said two or more processors is operable to detect the user gestures on said one or more corner sensors including one or more of position of a touch, duration of a touch, movement of a touch over a corner sensor surface, a wheel motion, a linear motion, a pressure hold, a tap, pressure levels and click gestures.

16. The electronic device according to claim 10, wherein at least one of said corner two or more sensors is operable to detect simultaneous touch gesture and pressure gesture input.

17. The electronic device according to claim 10, wherein said one or more processors are operable to detect when said electronic device is being held or touched by a user and disable one or more of said two or more corner sensors when said electronic device is not being held or touched by a user.

18. The electronic device according to claim 10, wherein said holding position of said electronic device for utilizing said two or more corner sensors includes a right hand mode and a left hand mode and said user gestures that are determined based on said holding position include thumb pressure, thumb click, bidirectional thumb motion, thumb wheel motion, index finger pressure, index finger click, simultaneous thumb and index finger squeeze, simultaneous thumb and index finger hold and click and simultaneous thumb and index finger hold and drag.

19. The method according to claim 2, wherein said holding position based on single handed use, right handed use, left handed use or use by both hands is configurable during set-up by a user.

* * * * *

UNITED STATES PATENT AND TRADEMARK OFFICE
CERTIFICATE OF CORRECTION

| | | |
|---|---|---|
| PATENT NO. | : 9,008,725 B2 | Page 1 of 1 |
| APPLICATION NO. | : 13/649832 | |
| DATED | : April 14, 2015 | |
| INVENTOR(S) | : David M. Schmidt | |

It is certified that error appears in the above-identified patent and that said Letters Patent is hereby corrected as shown below:

In the claims

Column 14, Claim 16, Line 25 replace "corner two or more sensors" with --two or more corner sensors--

Signed and Sealed this
Eighth Day of December, 2015

Michelle K. Lee
*Director of the United States Patent and Trademark Office*